(12) United States Patent
Sun

(10) Patent No.: US 6,307,452 B1
(45) Date of Patent: Oct. 23, 2001

(54) FOLDED SPRING BASED MICRO ELECTROMECHANICAL (MEM) RF SWITCH

(75) Inventor: Xi-Qing Sun, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/397,313

(22) Filed: Sep. 16, 1999

(51) Int. Cl.⁷ .................................................. H01G 23/00
(52) U.S. Cl. ............................................. 333/262; 361/233
(58) Field of Search ........................... 361/233; 333/101, 333/105, 262; 257/418

(56) References Cited

U.S. PATENT DOCUMENTS

| | | | |
|---|---|---|---|
| 5,578,976 | 11/1996 | Yao | 333/262 |
| 5,619,061 | 4/1997 | Goldsmith et al. | 257/528 |
| 5,880,921 | * 3/1999 | Tham | 361/233 |

* cited by examiner

Primary Examiner—Justin P. Bettendorf
Assistant Examiner—Dean O Takaoka
(74) Attorney, Agent, or Firm—A. Kate Huffman

(57) ABSTRACT

A micro electromechanical switch is formed on a substrate using a microplatform structure suspended on a spring suspension. The spring suspension is attached on one end to an anchor structure and extends in a substantially octagonal direction over a signal line. The microplatform has a shorting bar positioned facing a gap in the signal line and an electrical corset is formed on the signal fine to form a capacitor structure which is electrostatically attractable toward a bottom electrode upon application of a selected voltage. The switch functions from DC to at least 50 GHz with an electrical isolation of 35 dB and an insertion loss of 0.5 dB at 20 GHz. The RF switch has applications in telecommunications including wireless communications.

15 Claims, 2 Drawing Sheets

-PRIOR ART-

-PRIOR ART-

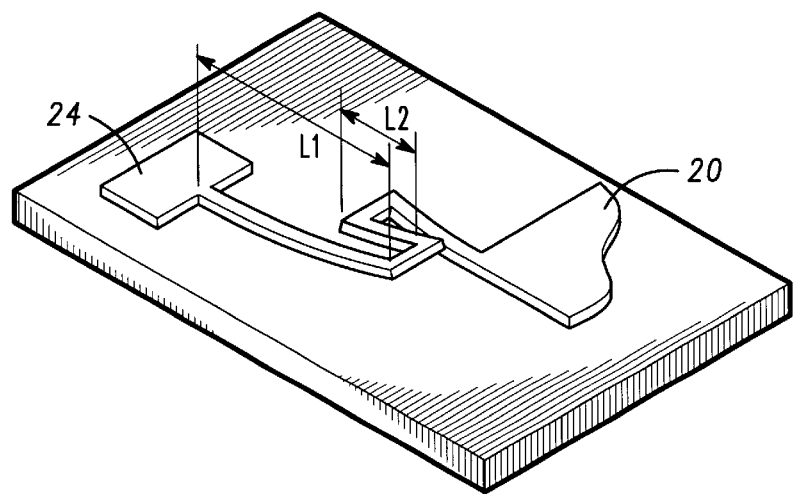
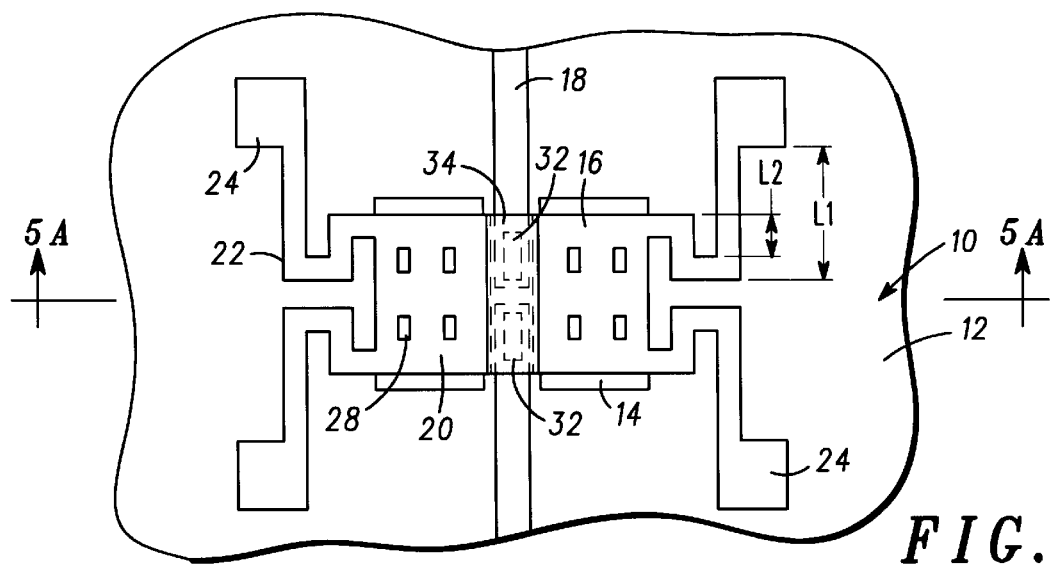
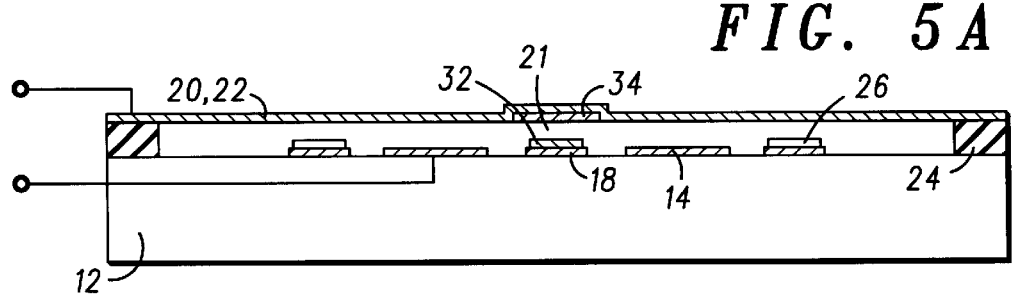
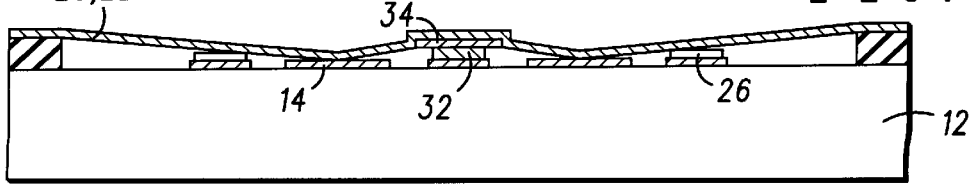

US 6,307,452 B1

FOLDED SPRING BASED MICRO ELECTROMECHANICAL (MEM) RF SWITCH

FIELD OF THE INVENTION

The present invention relates to micro electromechanical systems (MEMS) and, in particular, to a micro machined switch having a folded spring structure that functions with signal frequencies from DC up to at least 50 GHz.

BACKGROUND OF THE INVENTION

Micro machined, integrated radio frequency (RF) switches are favored for telecommunications applications because they provide a large dynamic range between on-state and off-state impedances in the RF regime while avoiding bulk and high cost. However, because of the proximity of the electrodes in such micro machine switches, there is a problem with arcing induced stiction. This problem becomes significantly increased in MEMS in which the RE switches are mechanically operated at high speed and must handle high power signals at frequencies of above 5 GHzs.

MEMS systems described in U.S. Pat. No. 5,578,976 are only able to handle low power RF signals at signal frequencies only up to 4 GHzs while maintaining a relatively minimum insertion loss in the "on" state and relatively high electrical isolation in the "off" state. The patented micro machined switches contain a micro machined armed cantelever actuator which is fixed at one end as shown in FIG. 1 reproduced from he '976 patent. In operation, as the cantelever actuator is switched on, only a line contact is made between the shorting bar and fixed electrical contacts of the switch. Therefore, the load carrying capacity of the micro switch is quite limited due to arcing and welding problems (See FIG. 2).

Micro switches that are based on a membrane structure and are fixed on a plurality of sides to the substrate are described in U.S. Pat. No. 5,619,061. The membrane structure is susceptible to thin-film stresses and has little tolerance for deflections which may be produced during the in-situ processing of the membrane. Therefore, functional failures of the devise are commonplace.

Thus, there still exists a need in telecommunication systems for micro electromechanical switches that provide a wide dynamic impedance range from on to off at signal frequencies from DC up to at least 50 GHz and that have a large load carrying capacity.

SUMMARY OF THE INVENTION

The present invention comprises a micro machined micro electromechanical switch which is capable of handling up to 50 GHz signal frequencies while maintaining excellent electrical isolation in the "off" state and minimal insertion loss in the "on" state while carrying a large load.

In a preferred embodiment, the RE switch is fabricated on an electrical insulating substrate having a suspended micro platform connected by a plurality of folded spring suspensions to the substrate through anchor structures. The micro platform structure provides a simultaneous plane-to-plane electrical contact in an air gap formed by the signal line on the substrate. A top electrode on the platform forms a capacitor structure above the signal line on the substrate and the capacitor's structure may preferably include a grid of holes extending through the op electrode and the platform. The holes, preferably have dimensions comparable to the gap between the platform and the bottom electrode and are also useful to reduce the bulk of the device. The switch is actuated by application of a voltage to the top electrode. When voltage is applied, electrostatic forces attract the capacitor structure on the platform toward the signal line to close the gap in the signal line. The switch functions from DC to at least 50 GHz with an electrical isolation of 35 dB and an insertion loss of 0.5 dB at 20 GHz.

The process of forming the micromachined switches uses a low temperature (250° C.) process with a photodash mask so that the switch may be integrated with microwave and radio frequency integrated circuits. Applications for the micromachined switch are in the telecommunications industry, particularly in wireless cellular phones.

As demonstrated in the prototype of the present invention, the micro electromechanical RF switch can be switched from the normally off-state (open circuit) to the on-state with 25 volts and maintained in either state with nearly zero power. In low pressure ambient helium, closure time and disclosure time in the switch are on the order of 20 microseconds. The switch can handle a current of at least 50 mA.

An object of the RF switch is to precisely control the area of the signal line gap for desired RF isolation and to provide a low RF insertion loss with large power handling capability.

BRIEF DESCRIPTION OF THE DRAWINGS

The foregoing and additional more specific objects and advantages of the instant invention will become readily apparent to those skilled in the art from the following detailed description of the preferred embodiments thereof taken in conjunction with the drawings in which:

FIG. 4 is a perspective side view of the inventive folded spring structure demonstrating the inventive folded spring structure of FIG. 3.

FIG. 5a is a side view of the inventive switch "off" state.

FIG. 5b is a side view of the invention in an "on" state.

FIG. 6 is a top plan view of a second embodiment of the folded spring structure according to the invention.

DETAILED DESCRIPTION OF PREFERRED EMBODIMENTS

The present invention is a micro electromechanical RF switch designed for applications with RF switches which operate at high speed and handle high power RF signals at frequencies ranging from DC up to at least 50 GHz.

Figure 1:
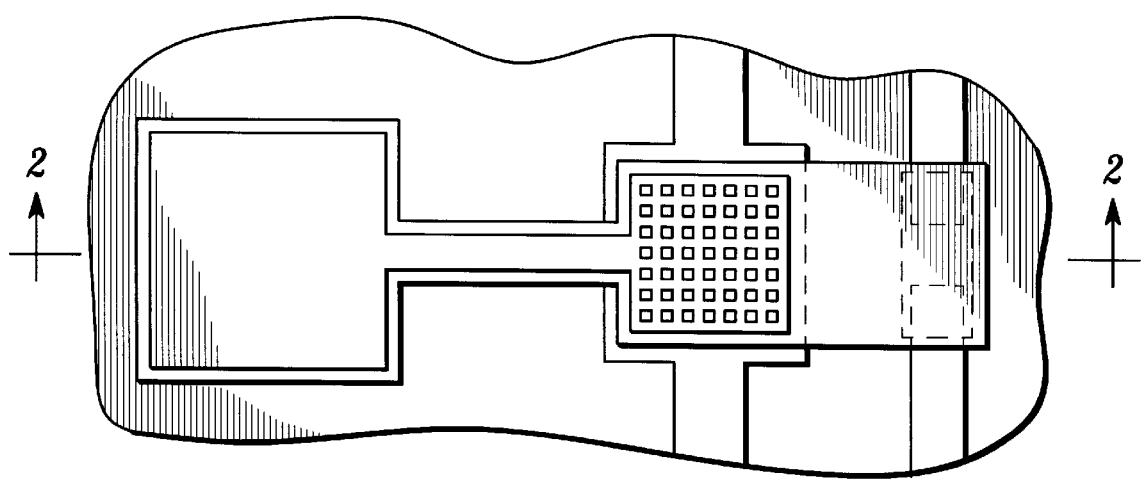
FIG. 1 is a top plan view of a micro electromechanical switch according to U.S. Pat. No. 5,578,976.
Figure 2:
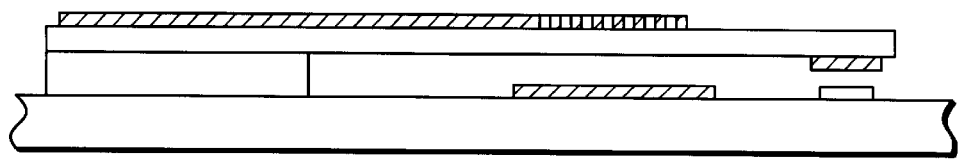
FIG. 2 is a cross-sectional view of the prior art MEMS switch taken along section lines 2—2 of FIG. 1.
Figure 3:
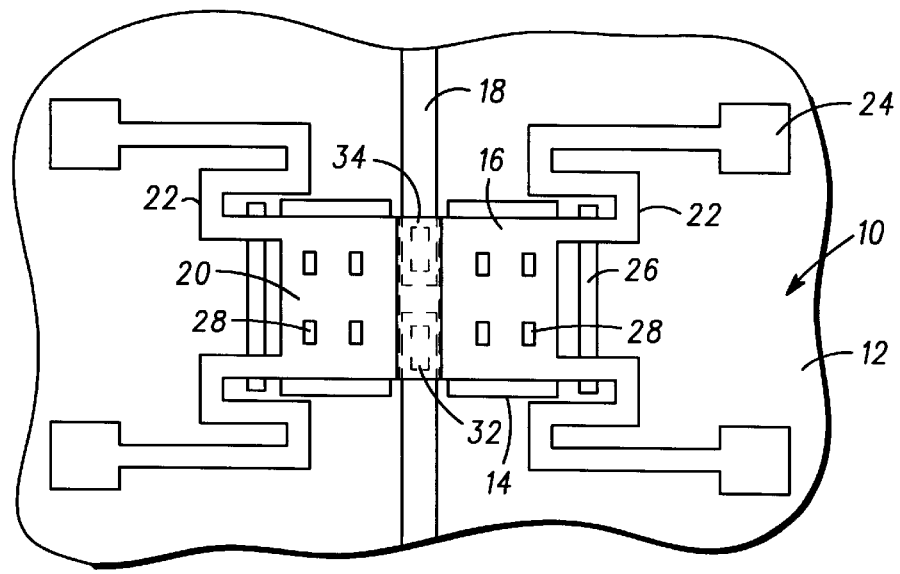
FIG. 3 is a top plan view of the preferred embodiment of the folded spring base switch structure of the invention.

In a preferred embodiment shown in FIG. 3, switch 10 is fabricated onto a substrate 12 composed of an electrically insulated material such as GaAs substrate, a glass substrate, an oxidized silicon wafer or a printed circuit board (PCB), for example. The switch is preferably fabricated using microfabrication techniques including masking, etching, deposition and lift-off, with a ceramic plate. The switch 10 is attached to the substrate 12 by an anchor structure 24. The anchor structure 24 may be formed as a mesa on substrate 12 by deposition build up or etching away surrounding material. A bottom electrode 14, typically connected to ground, and a signal line 18 are also formed on substrate 12. It will be noted, that signal line 18 may also be a plurality of signal lines. Bottom electrode 14 and signal line 18 are generally comprised of micro strips of a metal which won't easily oxidize such as gold, platinum, as way of example, which is deposited on substrate 12. A gap 21 formed by the signal line 18 is opened and closed by actuating the switch 10 as illustrated in FIGS. 5a and 5b.

The actuating portion of the switch 10 contains a micro platform structure 20 which is suspended over gap 21 and is preferably a symmetrically planar structure attached to an anchor 24 by a folded spring 22 as illustrated in FIG. 3. The folded spring 22 is bent at right angles and is orthogonally disposed between the anchor 24 and the suspended platform 20. Preferably, four folded springs are attached from four anchors 24 to each of four corners of the micro platform 20 as illustrated in FIG. 3.

Two parallel portions of the folded spring 22 have lengths L1 and L2, respectively, as showen in FIG. 4. The lengths L1 and L2, may be varied to provide a tool to adjust the gap 21 above the single signal line 18 as illustrated in FIG. 4. For example, length L2 may be kept constant and L1 may be lengthened to form a larger air gap. The larger the air gap, the higher the electrical isolations; however, low electrostatic actuation voltage generally requires small air gaps.

The folded configurations of the spring structures 20 act as mechanical stress buffers for the switch 10 in that most of the built in and graduant stresses are released at the folding portions of the springs 22. The springs contribute larger displacements compared to the microplatform 20 during motion of the switch 10.

The folded springs 22 also provide equal tensional forces connected to the microplatform 20 as shown in FIG. 4. Anchoring the microplatform 20 by means Of the springs 22 stretches the microplatform 20 from each of its four sides to thus maintain a flattened plane of the microplatform 20.

The microplatform 20 is preferably composed of two bimorph layers including an electrical insulation layer and an electrically conductive film. The electrical insulation layer of the microplatform 20 may be made of a material such a low temperature silicon, oxide, silicon nitride, silicon oxy-nitride, silicon carbide or and any other such materials know in the art. The electrically conductive film is preferably selected from materials such as tantalum, silicide, tungsten, gold, platinum and other such materials conventionally used in the art. The dielectric insulation layer acts as a main mechanical structure material while the conductive material acts as the electrostatic electrodes or thermal heaters. The combination of the two layers to forms the bimorph structure which can also be thermally actuated due to the stress mismatch between the two layers.

An electrical contact or contact post 32 is formed on the signal line 18 as best shown in FIGS. 5a and 5b. The contact posts 32 are conventionally composed of a metal such as gold, platinum or gold-platinum, which do not oxidize easily and are positioned on the signal line to face the shorting bar 34 of the microplatform 20. The contact posts 32 are formed in a conventional matter known in the art, particularly by sputtering or electron evaporation.

The contact posts 32 are built on the signal line 18 to extend to a greater height than the adjacent bottom electrodes 14 as illustrated in FIGS. 5a and 5b. By extending the contact post 32 to a greater height than the bottom electrodes 14, a smaller gap 21 is formed between the contact post 32 and the shorting bar 34.

The shorting bar 34 is formed on the microplatform 20 in a conventional manner known in the art. The shorting bar 34 extends from beneath the microplatform 20 to cover the contact post 32. The shorting bar 34 is preferably made of a conductive metal such as gold, platinum, gold-Rh or gold-platinum.

Optionally, as illustrated in FIG. 3, landing bumpers 26 are positioned beneath each of the four springs near the microplatform 20. Preferably, the bumpers 26 are symmetrically positioned directly beneath the springs at near the point where each spring is connected to the corner of the microplatform 20. In operation, the landing bumpers support the microplatform 20 when the microplatform 20 is moved to an "on" state such that a relatively small area of contact is made between the microplatform 20 and the bottom electrode 14. Stiction problems due to the physical contact between the microplatform 20 and the bottom electrode 14 is dramatically reduced. Then he microplatform 20 is moved to the "on" position, mechanical impact against the substrate occurs so that the landing bumpers 26 which are positioned outside the bottom electrode 14 functional area are used as mechanical buffers to prevent the microplatform 20 from directly impacting against the bottom electrode 14. The landing bumpers 26 further reduce the stiction from the charge injection into the dielectic layer of the platform. The landing bumpers 26 may be either electrically floated or be electrically connected to a top electrode 16.

In the preferred embodiments, the switch 10 is symmetrical as illustrated in FIG. 3. Another embodiment of the folded springs 22 of the invention is illustrated in FIG. 6. In this second embodiment the springs are folded in an orthogonal direction relative to the microplatform 20 so that the springs 22 have a more similar S-shape.

In operation when the switch is in the "on" state, the microplatform 20 is moved toward the substrate 12 and the shorting bar 34 makes contact with the underlying contact post 32 to produce a low impedance switch "on" signal as illustrated in FIG. 5b. The electrical contact area of the switch is determined by the magnitude of the top area of the contact posts 32.

The microplatform 20 and the folded springs 22 may be formed of a single conductive material layer such as gold, nickel, platinum, Rh and alloys thereof. When these materials are used, the microrelay type RF switch is simplified as a micro switch type without control/RF signal isolation or DC/RF isolation.

The contact post 32 may be formed of a noble metal that does not oxidize easily, such as gold, gold-platinum, gold/Rh, silver/nickel/platinum and silver/Rh as well as any other conventional metal known in the art.

A top electrode 16 typically comprising a metal such as aluminum or gold is formed on top of the platform 20. Top electrode 16 begins above the anchor structure 24 and extends along the top of the platform 20. Optionally, to enhance switch actuation performance, the platform 20 may be formed to include a grid of holes 28 which extend through the top electrode 16. The holes typically have dimensions of 1 to 10 microns, for example.

In operation, switch 10 is normally in a "off" position as shown in FIG. 5a. When the switch 10 is in the "off" position, the signal line 18 is an open circuit due to gap 21 and the separation of the signal lines 18. The switch 10 is actuated to an "on" position by applying a voltage to the top electrode 16. With a voltage on top electrode 16, electrostatic forces attract the platform 20 toward the bottom electrode 14 causing the shorting bar 34 with the contact post 32 to thereby close the gap 21 and place the signal line 18 in the "on" state as illustrated in FIG. 5b.

In a preferred environment, the contact posts 32 are extended to a greater height than the bottom electrodes 14 on the signal line 18 thus leaving a relatively smaller gap between the contact post 32 and the shorting bar 34 as illustrated in FIG. 5a. In the "on" position, the platform 20 moves toward the substrate and the shorting bar 34 makes contact with the underlying fixed contact post 32 to produce the low resistance switch on signal as illustrated in FIG. 5b. As the platform is switched on, the landing bumpers 26 support the platform 20 and only a small physical contact area is made between the platform 20 and the bottom electrodes 14.

In operation, the springs deflect as a DC bias is imposed into the electrodes 14, 16 and the microplatform 20 moves toward contact post 32. This deflection is accomplished because of the attachment of the suspended platform 20 to the substrate by means of the folded springs 22. The springs 22 contribute most of the displacement so that the platform 20 keeps a flat plane to touch the underlying contact post 32 as the applied voltage exceeds the switch threshold value. Once the folded spring 22 touches the underlying landing bumpers 26, the microplatform 20 starts to deform about the landing bumpers 26 to partially physically contact the bottom electrode 14 and to thus reduce charge injections and adhesion stictions as illustrated in FIGS. 5a and 5b. Thus the symmetrical structure of the switch 10 and the planar maintenance of the platform 20 as it is moved toward the bottom electrode 14 ensures a plane-to-plane contact between the shorting bar 34 and the contact post 32 to prevent arcing and provide large current carrying capability.

Preferably, the plane-to-plane contact area between the shorting bar 34 and the contact post 32 is as large as feasible to achieve the large current carrying capacity.

By way of example and not limitation, various component dimensions and design limitations in constructing the micro electromechanical switch 10 are as follows. The RF switch is manufactured by using surface microfabrication techniques using 6 masking levels as is conventionally known in the art. The fabrication process begins with substrate 12 that can be a thermally oxidized high resistivity silicon wafer, such as a semi-insulating GaAs wafer, a fully insulating glass or ceramic wafer, or even a printed circuit board (PCB).

In forming the microplatform 20, suspension spring 22, anchor 24, shorting bar 34, contact post 32, signal line 18, landing bumpers 26, and electrodes 14 and 16, a metal film is deposited on substrate 12 and patterned by an etching or lifting-off technique to form an RF signal line 18 and bottom electrode 14. A layer of polyimide is spin-coated on substrate 12, followed by a sequence of thermal curing at temperatures no higher than 350° C. A second layer of polyimide is coated and hard cured. A 250 nm thick SiON film is then deposited and patterned as masking materials. An oxygen plasma RIE (reactive ion etch) is then applied to transfer the patterns into the underlying two layers of polyimide and thus form an ideal lift-off profile. A metal film for the contact post 32 and the landing bumper 26 having a thickness ranging from 500 nm to 2.0 $\mu$m is deposited. Metal lift-off is completed by stripping off the second polyimide layer in a standard polyimide stripper while the first polyimide layer still remains on the substrate 12.

A second layer of polyimide is spin-coated and cross-linked to form a sacrificial layer together with the first polyimide layer. The second polyimide layer A second layer polyimide is spin-coated and cross-linked to form a sacrificial layer together with the first polyimide layer. The second polyimide layer may be the same material as the first one so as to avoid any thermal expansion mismatch induced by two different materials. Anchor structure 24 may be fabricated using any conventional method know in the art. For example, a via may be formed by moving the polyimide sacrificial layer around the anchor area in oxygen plasma RIE. Then anchor 24 is formed either by electroplating metal into the via or by the tri-layer metal lift-off process. Anchor 24 preferably has a thickness equal to that of the polyimide sacrificial layer. In another conventional method, a relatively large area anchor is designed to maintain enough polyimide to support the suspended structure after laterally undercutting the polyimide underneath springs 22 and microplatform 20.

A layer of metal for the shorting bar 34 having a thickness ranging from 300 nm to 1.5 $\mu$m is deposited on the polyimide and lifted off to form the shorting bar 34. A layer of PECVD silicon oxy-nitride, silicon oxide or silicon nitride with a thickness ranging from 0.5 to about 2.5 $\mu$m is deposited and patterned to form the suspension spring 22 and the microplatform 20. A layer of conductive material such as gold, platinum, aluminum, ti-tungsten, or silicide having a thickness ranging from 50 nm to 500 nm is than deposited and lifted off to form top electrode 16. Finally the entire structure is released by removing the polyimide sacrificial layer in an oxygen plasma asher.

EXAMPLE

DC and RF characterizations were all performed on a prototype RF switch in the present invention in a hermetically sealed low-pressure helium ambient. The measured RF switch was fabricated on a glass substrate with a 2.0 $\mu$m air gap, a 150 $\mu$m spring length L1, a 1.6 $\mu$m thick dielectric silicon oxy-nitride structural film, a 100 $\mu$m×50 $\mu$m microplatform, a 6 $\mu$m×10 $\mu$m contact post. From the DC tests, the switch-on and switch-off resistances were less than 1.0 ohms and greater than $10^{12}$ ohms, respectively. This switch was electrostatically switched with a voltage as low as 25V. The switch closure and disclosure times were about 20 $\mu$S. It was observed that higher actuation voltage can reduce switch response times. The DC current carrying capacity for the RE switch was over 50 mA. The DC power consumed on switch-on state is about 1.0 $\mu$W, mostly contributed by DC current leakage through the dielectric film. From RF probe tests, it was observed that the RF switch can handle broad-bank signals at frequencies from DC to 50 GHz and even higher with very good performances in terms of low insertion loss, high isolation and low return loss. For example, an insertion loss of less than 0.2 dB at 800 MHz and 0.5 dB at 20 GHz; an electrical isolation of greater than 65 dB at 800 MHz and 35 dB at 20 GHz; a return loss of 26 dB at 800 MHz and 13 dB at 20 GHz were achieved.

Although the present invention has been described with respect to specific embodiments thereof, various changes and modifications can be carried out by those skilled in the art without departing from the scope of the invention.

I claim:

1. A micro electromechanical switch formed on a substrate comprising:
   (a) an anchor structure, a bottom electrode, and at least one separate signal line formed on the substrate, the signal line having a gap forming an open circuit;
   (b) a spring suspension attached on one end to the anchor structure and extending in a substantially orthogonal direction toward the bottom electrode, the spring suspension having a second end;
   (c) a microplatform structure attached by four spring suspensions to a second end of the spring suspension and having a shorting bar formed on a portion remote form the spring suspension, the shorting bar positioned facing the gap in the signal line; and (d) an electrical contact post formed on the signal line and positioned to face the shorting bar and forming a capacitor structure electrostatically attractable toward the bottom electrode upon selective application of a voltage on the shorting bar.

2. The micro electromechanical switch according to claim 1 wherein the microplatform is symmetrical.

3. The microelectromechanical switch according to claim 1 wherein the spring suspension comprises a single film comprising a metal layer.

4. The micro electromechanical switch according to claim 1 wherein the microplatform comprises an electrical insulation layer and an electrically conductive film.

5. The micro electromechanical switch according to claim 4 wherein the electrical insulation layer is formed of a dielectric material selected from the group consisting of silicon oxide, silicon nitride, silicon oxynitride, silicon carbide and mixtures thereof.

6. The microelectromechanical switch according to claim 4 wherein the electrically conductive film is formed of a material selected from the group consisting of tantalum silicide, tungsten, gold, platinum and mixtures thereof.

7. The micro electromechanical switch according to claim 1 wherein the substrate comprises an electrically isolated material selected from the group consisting of silicon, glass, gallium arsenide, ceramic, and printed circuits board.

8. The microelectromechanical switch according to claim 1 wherein the spring suspension comprises a composite film comprising an electrical insulation layer on bottom and an electrical conductive layer on top.

9. A microelectromechanical RF switch formed on a substrate comprising:

(a) an anchor structure, a bottom electrode, and at least one separate signal line formed on the substrate, the signal line having a gap forming an open circuit;

(b) a spring suspension attached on one end to the anchor structure and extending in a substantially orthogonal direction toward the bottom electrode, the spring suspension having a second end;

(c) a platform structure attached by four spring suspensions to a second end of the spring suspension and having a shorting bar formed on an end remote from the spring suspension, the shorting bar positioned facing the gap in the signal line; and (d) an metal contact formed on the signal line and positioned to face the shorting bar and forming a capacitor structure; and (e) a voltage selectively applied to the top electrode generating an electrostatic force attracting the capacitor structure toward the bottom electrode wherein, the metal contact on the microplatform closes the gap in the signal line.

10. The micro electromechanical RF switch according to claim 9 wherein the substrate comprises an electrically isolated material selected from the group consisting of silicon, glass, gallium arsenide, ceramic, and printed circuits board.

11. The micro electromechanical RF switch according to claim 9 wherein the microplatform is symmetrical.

12. The microelectromechanical RF witch according to claim 9 wherein the spring suspension comprises a composite film comprising an electrical insulation layer on bottom and an electrical conductive layer on top.

13. The micro electromechanical RF switch according to claim 9 wherein the microplatform comprises an electrical insulation layer and an electrically conductive film.

14. The micro electromechanical RF switch according to claim 13 wherein the electrical insulation layer is formed of a dielectric material selected from the group consisting of silicon oxide, silicon nitride, silicon oxynitride, silicon carbide and mixtures thereof.

15. The microelectromechanical RF switch according to claim 13 wherein the electrically conductive film is formed of a material selected from the group consisting of tantalum silicide, tungsten, gold, platinum and mixtures thereof.

* * * * *